(12) United States Patent
Sawada et al.

(10) Patent No.: US 11,989,674 B2
(45) Date of Patent: May 21, 2024

(54) WORK ASSIST SERVER, WORK ASSIST METHOD, AND WORK ASSIST SYSTEM

(71) Applicant: KOBELCO CONSTRUCTION MACHINERY CO., LTD., Hiroshima (JP)

(72) Inventors: Yusuke Sawada, Hiroshima (JP); Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 17/774,272

(22) PCT Filed: Aug. 12, 2020

(86) PCT No.: PCT/JP2020/030681
§ 371 (c)(1),
(2) Date: May 4, 2022

(87) PCT Pub. No.: WO2021/106279
PCT Pub. Date: Jun. 3, 2021

(65) Prior Publication Data
US 2022/0391811 A1 Dec. 8, 2022

(30) Foreign Application Priority Data
Nov. 25, 2019 (JP) .................................. 2019-212618

(51) Int. Cl.
*G06Q 10/00* (2023.01)
*G06Q 10/0631* (2023.01)
(52) U.S. Cl.
CPC .............................. *G06Q 10/06316* (2013.01)

(58) Field of Classification Search
CPC ............. G06Q 10/063; G06Q 10/0631; G06Q 10/06316; G06Q 10/06311;
(Continued)

(56) References Cited

U.S. PATENT DOCUMENTS

2004/0004540 A1 1/2004 Komatsu et al.
2014/0032058 A1* 1/2014 Stratton .................. E02F 9/261
701/50
(Continued)

FOREIGN PATENT DOCUMENTS

JP 2003-333590 A 11/2003
JP 2019-082765 A 5/2019
(Continued)

OTHER PUBLICATIONS

Rui, Lanlan, et al. "Context-based intelligent scheduling and knowledge push algorithms for ar-assist communication network maintenance." Computer Modeling in Engineering & Sciences 118.2 (2019): 291-315. (Year: 2019).*

(Continued)

*Primary Examiner* — William S Brockington, III
(74) *Attorney, Agent, or Firm* — Carrier, Shende & Associates P.C.; Fulchand P. Shende; Joseph P. Carrier

(57) ABSTRACT

Provided are a server and a system which enable a worker of a work machine to intuitively recognize work contents and the like to be performed using the work machine in each of a plurality of work locations. In response to a first designated operation through a remote input interface 210 of a remote operation device 20, a remote output interface 220 of the remote operation device 20 outputs a work environment image showing positions of designated work locations Q1 and Q2, and information about at least one of a designated work period and a designated work content. The designated work location, the designated work period and (Continued)

the designated work content are included in designated work information that is work information fitting a designated position depending on the first designated operation among a plurality of pieces of work information registered in a database 102.

3 Claims, 7 Drawing Sheets

(58) Field of Classification Search
CPC ..... G06Q 10/06312; G06Q 10/063116; G06Q 10/063114
See application file for complete search history.

(56) References Cited

U.S. PATENT DOCUMENTS

| | | | |
|---|---|---|---|
| 2017/0016211 A1* | 1/2017 | Arimatsu | G01S 19/14 |
| 2017/0131718 A1* | 5/2017 | Matsumura | A01B 69/008 |
| 2018/0027218 A1* | 1/2018 | Kiso | H04N 9/3194 |
| | | | 705/7.14 |
| 2018/0170719 A1* | 6/2018 | Tasch | B66C 15/00 |
| 2018/0374026 A1* | 12/2018 | Osawa | G06F 9/453 |
| 2019/0019429 A1* | 1/2019 | Palberg | G09B 9/05 |
| 2019/0236515 A1* | 8/2019 | Murdock | G06Q 10/10 |
| 2021/0079625 A1 | 3/2021 | Narikawa et al. | |

FOREIGN PATENT DOCUMENTS

| | | | | |
|---|---|---|---|---|
| KR | 20110110648 A | 10/2011 | | |
| WO | WO-2017174195 A1 * | 10/2017 | | G05B 19/19 |
| WO | 2019/131743 A1 | 7/2019 | | |

OTHER PUBLICATIONS

Extended European search report dated Nov. 18, 2022 issued in the corresponding EP Patent Application No. 20893592.4.

* cited by examiner

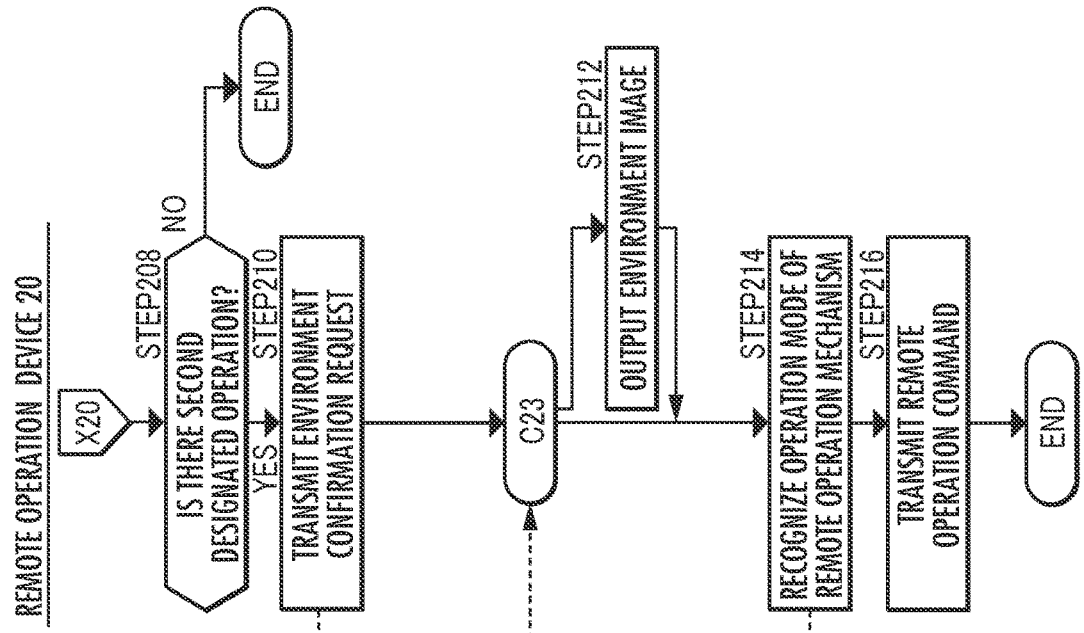
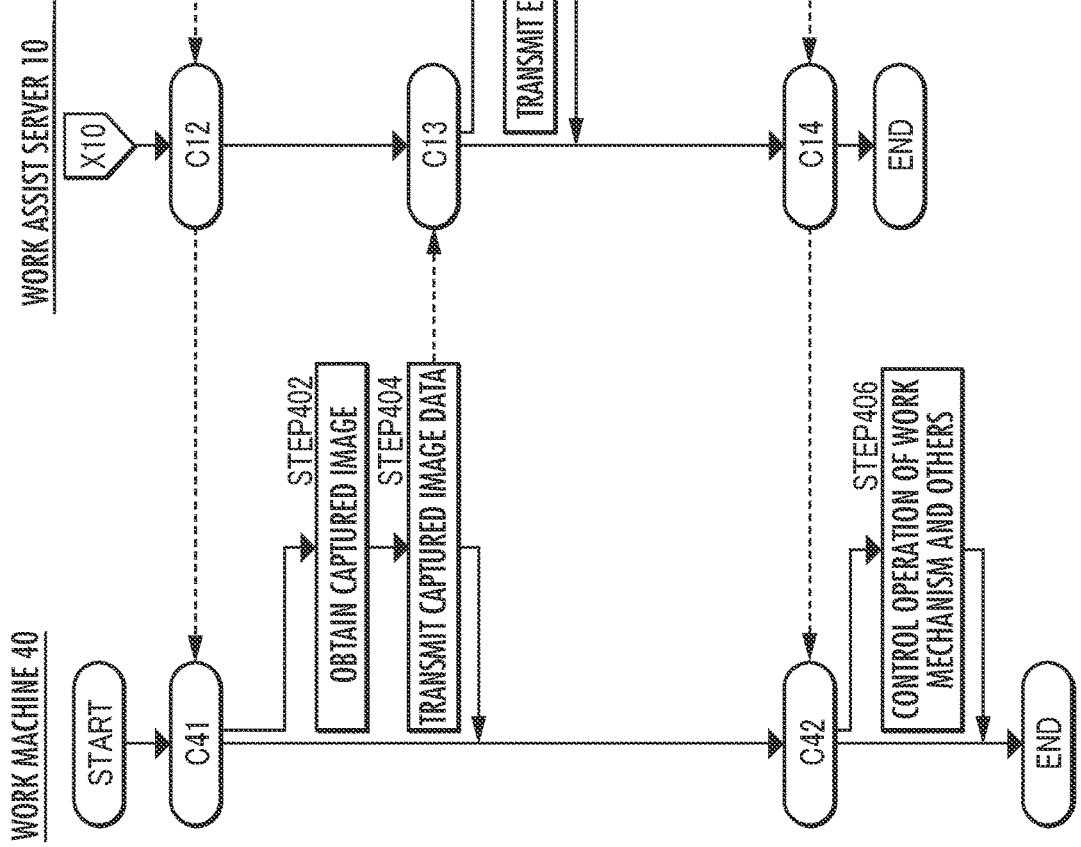
FIG.5

FIG.6

| NO. | PLACE | DETAILED AREA | START TIME | SCHEDULED END TIME | WORK CONTENT | SCHEDULED ●● |
|---|---|---|---|---|---|---|
| 1 | EAST WORKPLACEE | GRAVEL AREA | 9:00 | 9:15 | SOIL LOADING | △△m³ |
| 2 | EAST WORKPLACEE | COARSE SAND AREA | 9:15 | 9:35 | PILE-UP | UNTIL TIME |
| 3 | SOUTH WORKPLACE | GRAVEL AREA | 9:40 | 9:50 | MOVE | m |
| 4 | SOUTH WORKPLACE | MEDIUM SAND AREA | 9:50 | 10:05 | SOIL LOADING | △△m³ |
| 5 | SOUTH WORKPLACE | GRAVEL AREA | 10:05 | 10:20 | PILE-UP | UNTIL TIME |

WORK ASSIST SERVER, WORK ASSIST METHOD, AND WORK ASSIST SYSTEM

TECHNICAL FIELD

The present invention relates to a work assist server to assist a worker in performing work by use of a work machine, through communication with a client assigned to the worker of the work machine.

BACKGROUND ART

There has been proposed a technology of grasping a three-dimensional shape of a construction work site, and accurately informing a construction equipment operator of a relation between a finishing stake and a current status, a travelable range, a dangerous range and the like (see Patent Literature 1, for example). Specifically, distance images obtained from stereo cameras arranged in separate places, respectively, are integrated to generate three-dimensional model data of the construction work site. Then, an image of the construction work site seen from a virtual perspective designated by the operator of the construction equipment is drawn based on the three-dimensional model data and displayed at a driving seat of the construction equipment.

CITATION LIST

Patent Literature

Patent Literature 1: Japanese Patent Laid-Open No. 2003-333590

SUMMARY OF INVENTION

Technical Problem

In a case where a worker performs work by use of one or more work machines in each of a plurality of work locations that are away from one another and in each of different time zones, it is preferable that work contents and the like to be performed can be grasped for smoothly performing the work.

To solve the problem, an object of the present invention is to provide a server and a system which enable a worker of a work machine to intuitively recognize work contents and the like to be performed using the work machine in each of a plurality of work locations.

Solution to Problem

The present invention relates to a work assist server to assist a worker in performing work by use of a work machine, by communication with a client assigned to the worker of the work machine.

The work assist server of the present invention comprises a database which stores and holds, as work information, a plurality of combinations of work locations, work periods and work contents, a first assist processing element which recognizes a designated position depending on a designated operation through an input interface of the client, based on the communication with the client, and which searches the database for the work information fitting the designated position as designated work information, and a second assist processing element which causes an output interface of the client to output a work environment image showing a position of a designated work location included in the designated work information searched by the first assist processing element, and information about at least one of a designated work period and a designated work content included in the designated work information, based on the communication with the client.

A work assist system of the present invention comprises the work assist server, and the client.

According to the work assist server and the work assist system (hereinafter referred to as "the work assist server and the like" as appropriate) of the present invention, in response to the designated operation through the input interface of the client, the output interface of the client outputs the work environment image showing the position of the designated work location, and the information about at least one of the designated work period and the designated work content. The designated work location, the designated work period and the designated work content are included in the designated work information that is work information fitting the designated position depending on the designated operation among a plurality of pieces of work information registered in the database. Consequently, the worker of the work machine can recognize outline of the work to be performed using the work machine, which fits the designated position, from the work environment image, and the information about at least one of the designated work period and the designated work content.

Consequently, for example, it is easy for the worker to move the work machine to the designated work location by beginning of the designated work period or to achieve an operable state of the work machine existing in the designated work location. Then, the worker can smoothly perform the work depending on the designated work content by use of the work machine over the designated work period.

BRIEF DESCRIPTION OF DRAWINGS

FIG. 5 is an explanatory view concerning a second function of the work assist system.

FIG. 6 is an explanatory view concerning work information.

DESCRIPTION OF EMBODIMENTS (Configuration of Work Assist System)

Figure 1:
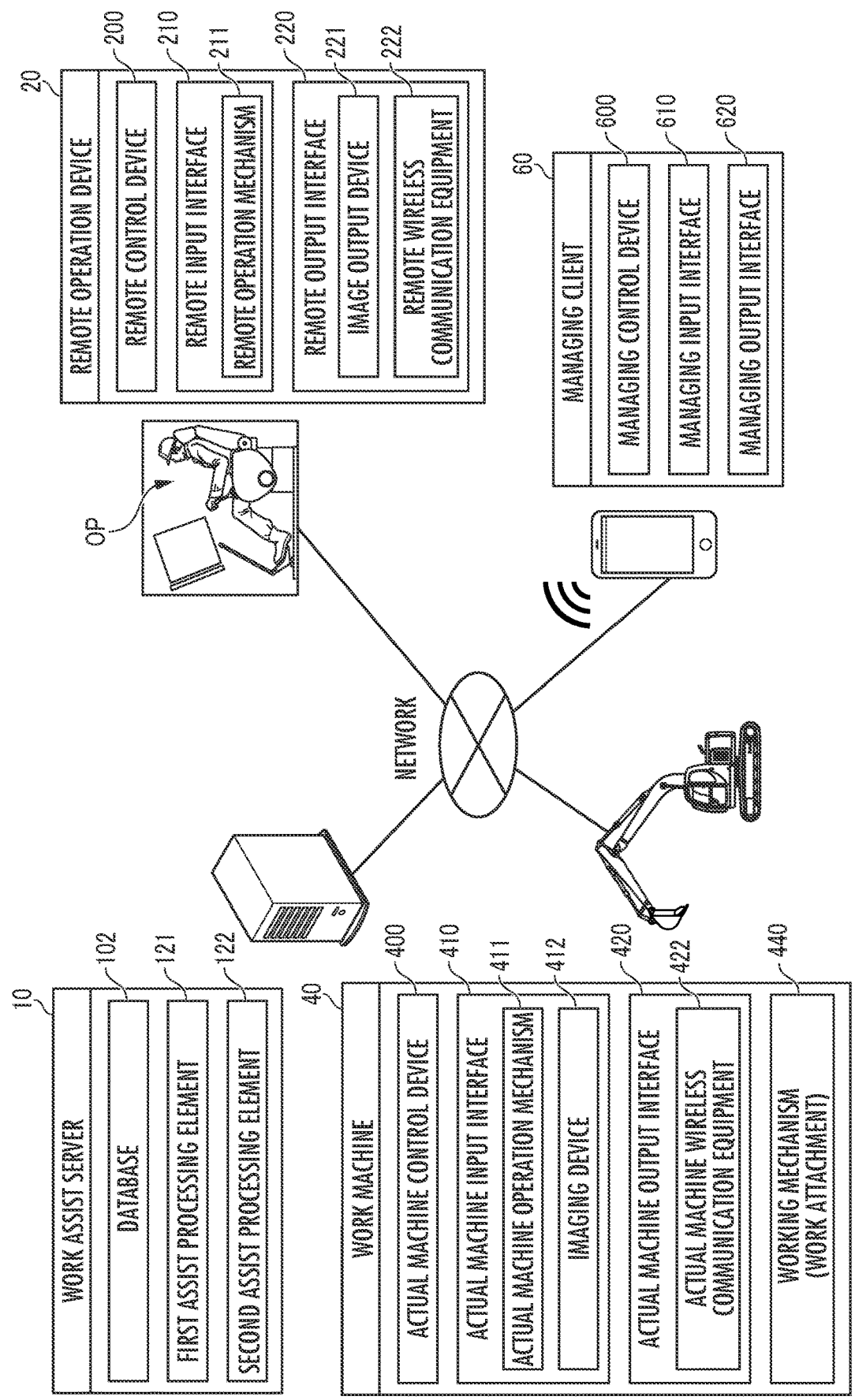
FIG. 1 is an explanatory view concerning a configuration of a work assist system as an embodiment of the present invention.

A work assist system as an embodiment of the present invention shown in FIG. 1 includes a work assist server 10, and a remote operation device 20 to remotely operate a work machine 40. The work assist server 10, the remote operation device 20, the work machine 40 and a managing client 60 are configured to be mutually network communicable.

(Configuration of Work Assist Server)

The work assist server 10 comprises a database 102, a first assist processing element 121, and a second assist processing element 122. The database 102 stores and holds, as work information, a plurality of combinations of work locations, work periods and work contents. The database 102 may include a database server separate from the work assist server 10. Each assist processing element includes an arithmetic processing unit (a single core processor or a multi-core processor or a processor core included in the multi-core processor) and reads required data and software from a storage device such as a memory and executes after-mentioned arithmetic processing for the data as a target in accordance with the software.

(Configuration of Remote Operation Device)

The remote operation device 20 constituting a client (a first client) comprises a remote control device 200, a remote input interface 210, and a remote output interface 220. The remote control device 200 includes an arithmetic processing unit (a single core processor or a multi-core processor or a processor core included in the multi-core processor) and reads required data and software from a storage device such as a memory and executes arithmetic processing for the data as a target in accordance with the software. The remote input interface 210 comprises a remote operation mechanism 211. The remote output interface 220 comprises an image output device 221 and remote wireless communication equipment 222.

The remote operation mechanism 211 includes an operation device for traveling, an operation device for turning, an operation device for boom, an operation device for arm, and an operation device for bucket. Each operation device includes operation levers receiving a rotating operation. The operation levers (travel levers) for the operation device for traveling are operated to move a lower traveling body 410 of the work machine 40. The travel levers may also serve as travel pedals. For example, the travel pedals fixed to a base portion or a bottom end of the travel levers may be provided. The operation lever (turn lever) of the operation device for turning is operated to move a hydraulic swing motor included in a turning mechanism 430 of the work machine 40. The operation lever (boom lever) of the operation device for boom is operated to move a boom cylinder 442 of the work machine 40. The operation lever (arm lever) of the operation device for arm is operated to move an arm cylinder 444 of the work machine 40. The operation lever (bucket lever) of the operation device for bucket is operated to move a bucket cylinder 446 of the work machine 40.

Figure 2:
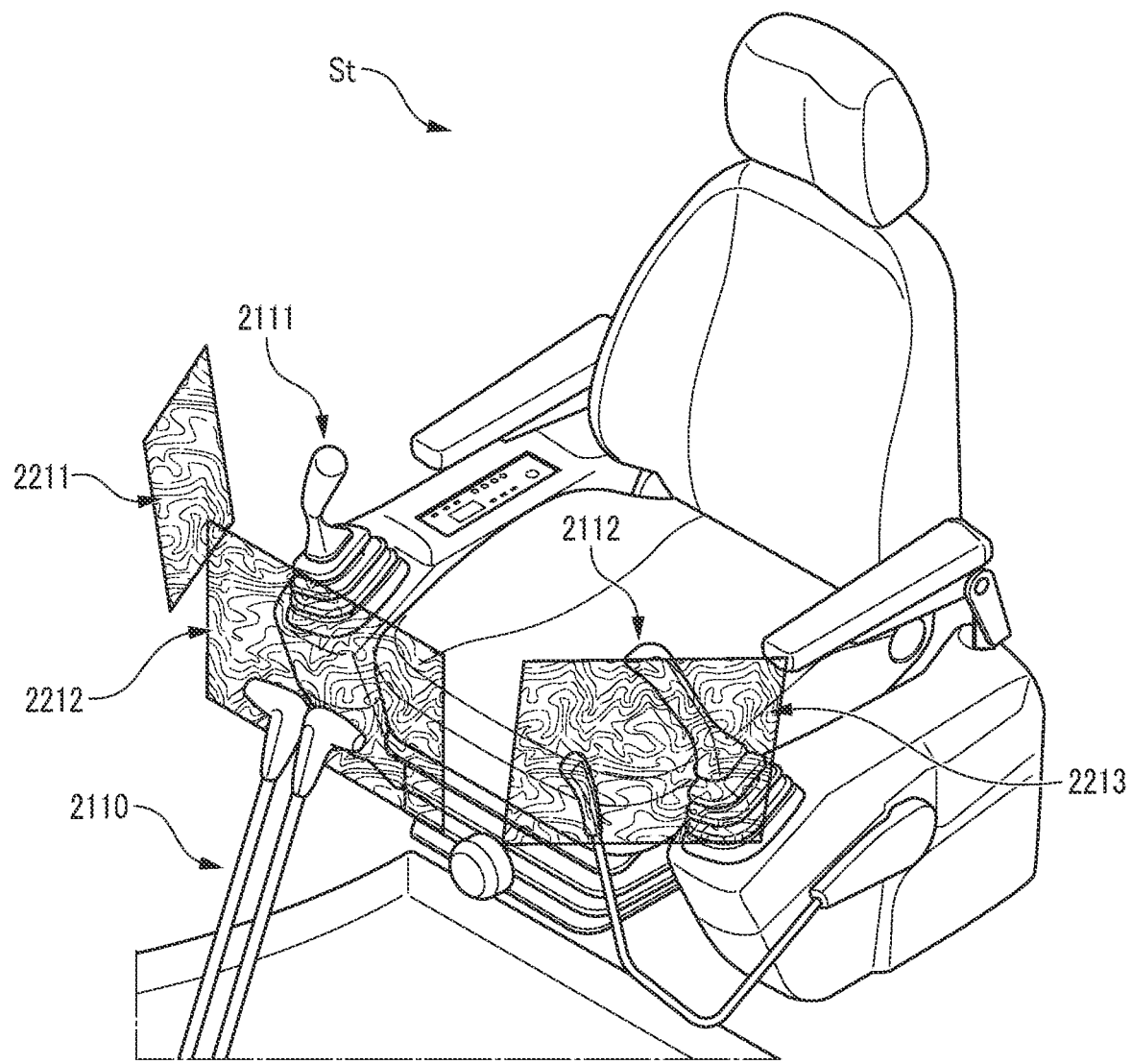
FIG. 2 is an explanatory view concerning a configuration of a remote operation device.

The respective operation levers included in the remote operation mechanism 211 are arranged around a seat St on which an operator sits as shown in FIG. 2, for example. The seat St has such a form as in a high back chair with armrests and may have any form on which a remote operator OP2 can sit, such as a form of a low back chair without a headrest or a form of a chair without a backrest.

In front of the seat St, a pair of left and right travel levers 2110 corresponding to left and right crawlers are arranged laterally in a left-right direction. One operation lever may serve as a plurality of operation levers. For example, a right-side operation lever 2111 provided in front of a right frame of the seat St shown in FIG. 2 may function as the boom lever when being operated in a front-rear direction and function as the bucket lever when being operated in a left-right direction. Similarly, a left-side operation lever 2112 provided in front of a left frame of the seat St shown in FIG. 2 may function as the arm lever when being operated in the front-rear direction and function as the turn lever when being operated in the left-right direction. A lever pattern may be arbitrarily changed depending on an operator's operation instruction.

For example, as shown in FIG. 2, the image output device 221 includes a diagonally right forward image output device 2211, a front image output device 2212 and a diagonally left forward image output device 2213 arranged diagonally forward to the right of the seat St, in front of the seat, and diagonally forward to the left of the seat, respectively. The image output devices 2211 to 2213 may further comprise a speaker (voice output device).

(Configuration of Work Machine)

The work machine 40 comprises an actual machine control device 400, an actual machine input interface 410, an actual machine output interface 420, and a working mechanism 440. The actual machine control device 400 includes an arithmetic processing unit (a single core processor or a multi-core processor or a processor core included in the multi-core processor) and reads required data and software from a storage device such as a memory and executes arithmetic processing for the data as a target in accordance with the software.

Figure 3:
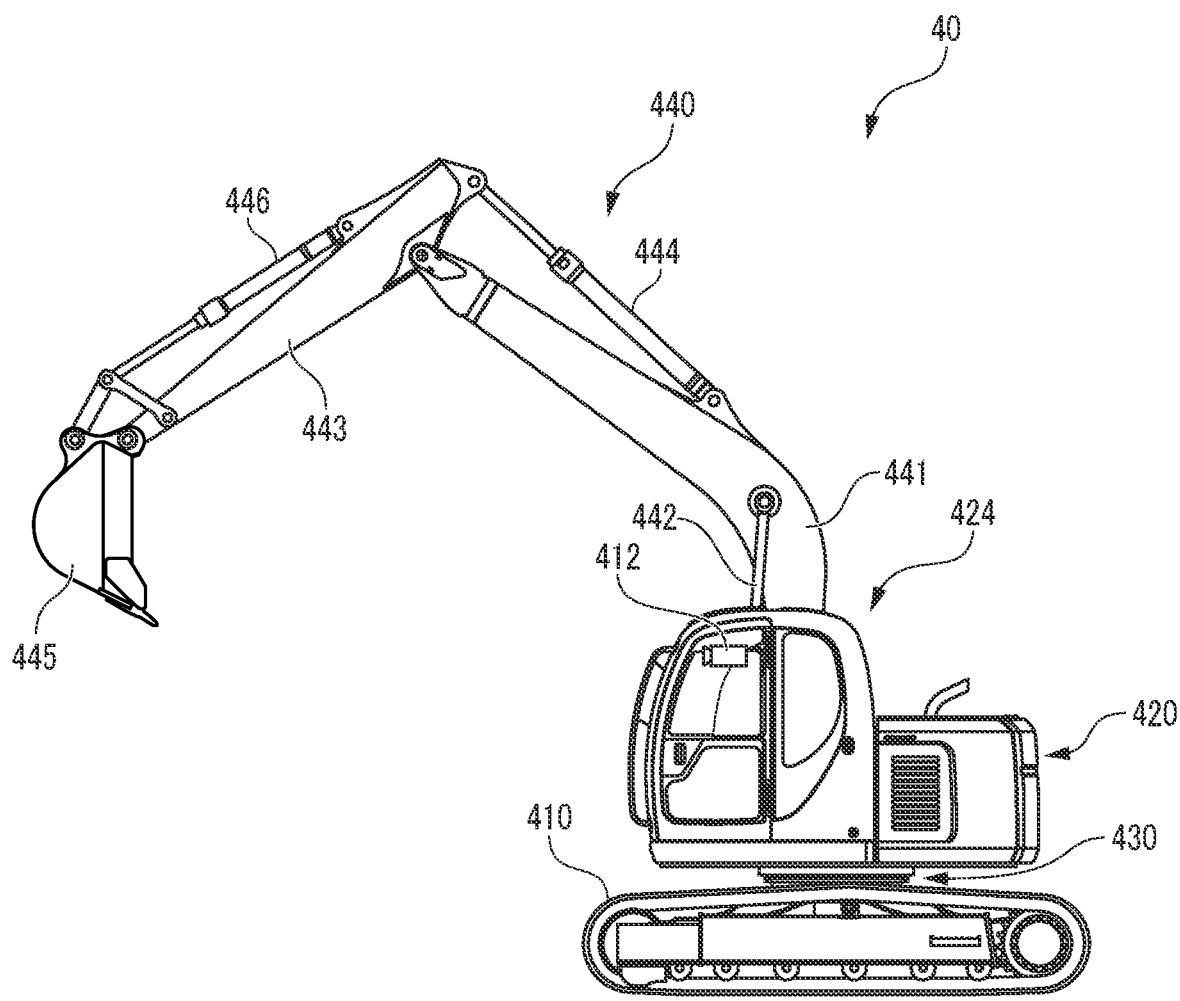
FIG. 3 is an explanatory view concerning a configuration of a work machine.

The work machine 40 is, for example, a crawler shovel (construction machine), and comprises the crawler lower traveling body 410, and an upper turning body 420 rotatably mounted on the lower traveling body 410 via the turning mechanism 430 as shown in FIG. 3. In a front left part of the upper turning body 420, a cab (driver's cab) 424 is provided. In a front center part of the upper turning body 420, a work attachment 440 is provided.

The actual machine input interface 410 comprises an actual machine operation mechanism 411 and an imaging device 412. The actual machine operation mechanism 411 comprises a plurality of operation levers arranged around a seat disposed inside the cab 424 in the same manner as in the remote operation mechanism 211. A drive mechanism or a robot which receives a signal depending on an operation mode of a remote operation lever and moves an actual machine operation lever based on the received signal is provided in the cab 424. The imaging device 412 is installed, for example, inside the cab 424, and images an environment including at least a part of the working mechanism 440 through a front window of the cab 424.

The actual machine output interface 420 comprises actual machine wireless communication equipment 422.

The work attachment 440 as the working mechanism comprises a boom 441 mounted on the upper turning body 420 such that the boom can be undulated, an arm 443 rotatably coupled to a tip end of the boom 441, and a bucket 445 rotatably coupled to a tip end of the arm 443. The boom cylinder 442, the arm cylinder 444 and the bucket cylinder 446, each of which is configured with a telescopic hydraulic cylinder, are attached to the work attachment 440.

The boom cylinder 442 is interposed between the boom 441 and the upper turning body 420 to receive supply of hydraulic oil and extend and retract, thereby rotating the boom 441 in an undulating direction. The arm cylinder 444 is interposed between the arm 443 and the boom 441 to receive the supply of hydraulic oil and extend and retract, thereby rotating the arm 443 to the boom 441 about a horizontal axis. The bucket cylinder 446 is interposed between the bucket 445 and the arm 443 to receive the supply of hydraulic oil and extend and retract, thereby rotating the bucket 445 to the arm 443 about the horizontal axis.

(Configuration of Managing Client)

The managing client 60 is a terminal device such as a smartphone or a tablet terminal, and comprises a control device 600, a managing input interface 610, and a managing output interface 620. The control device 600 includes an arithmetic processing unit (a single core processor or a multi-core processor or a processor core included in the multi-core processor) and reads required data and software from a storage device such as a memory and executes arithmetic processing for the data as a target in accordance with the software.

The managing input interface 610 includes a button, a switch or the like of a touch panel. The managing output interface 620 comprises an image output device, and wireless communication equipment.

(Function)

(Registration of Work Information and Registered Content Change)

Description will be made as to a function of the work assist system with the above configuration with reference to flowcharts shown in FIG. 4. In the flowcharts, a block denoted with a reference sign starting with "C" is used for simplicity of description, means data transmission and/or reception and means conditional branch in which processing in a branch direction is executed on conditions of the data transmission and/or reception.

When each constituent element (arithmetic processing resource or hardware resource) of the present invention "recognizes" information, the recognizing is concept including processing to prepare information in any form available for subsequent processing, such as receiving of the information, reading or retrieving of the information from the storage device or the like, writing (storing and holding) or registering of the information in the storage device or the like, presuming, determining, identifying, measuring, predicting or the like of the information by executing arithmetic processing of an output signal of the sensor and/or basic information according to predetermined algorithm, and the like.

Figure 4:
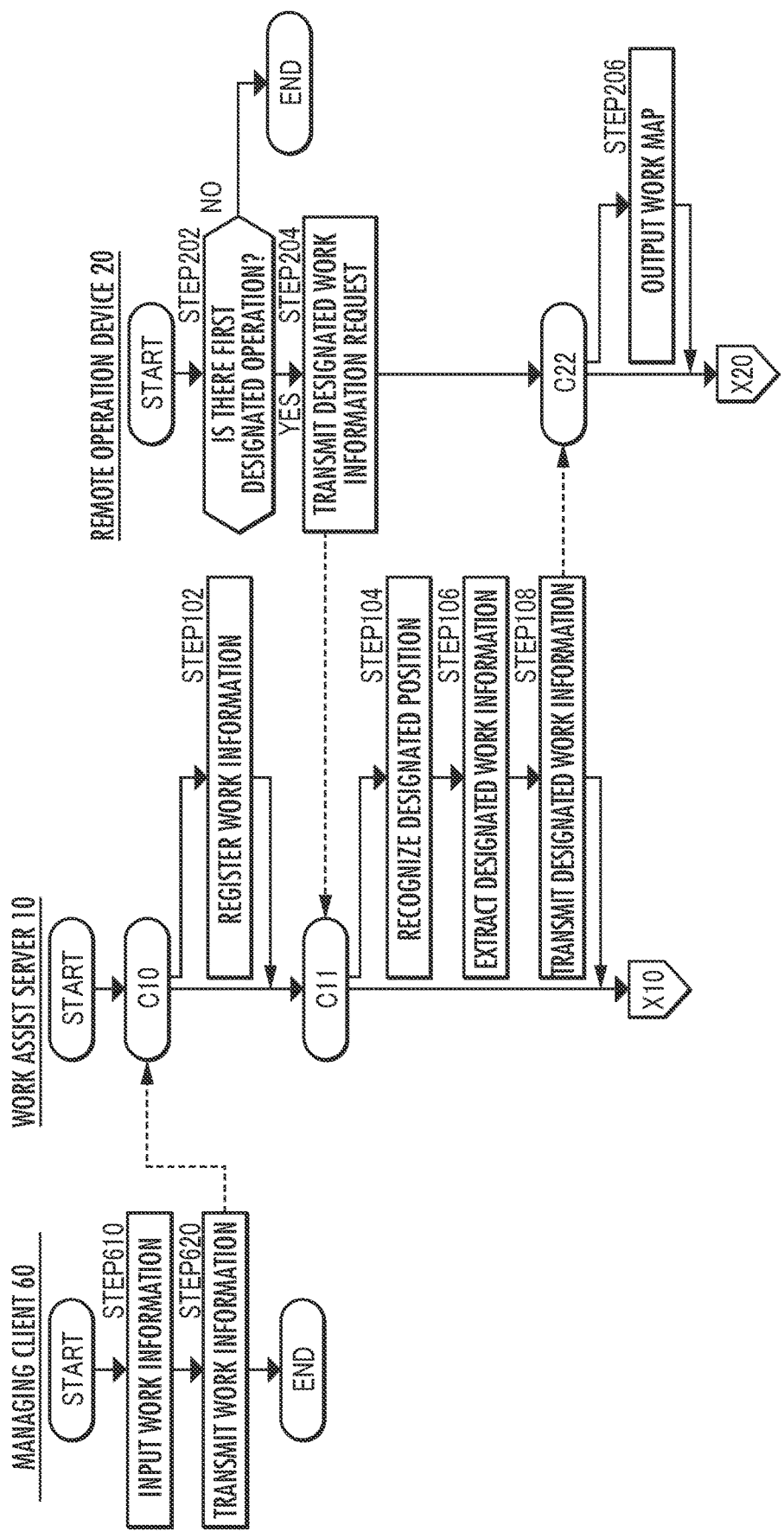
FIG. 4 is an explanatory view concerning a first function of the work assist system.

First, in the managing client 60 (second client), a manager inputs work information to be newly registered in the database 102 or a change content of registered work information, through the managing input interface 610 (FIG. 4/STEP610).

The work information includes a plurality of combinations of work locations, work periods and work contents. "The work location" may be designated by being divided into a plurality of levels of areas. For example, as shown in FIG. 6, "the work location" may be designated by a rough work location (an east workplace, a south workplace or the like) and a detailed work location (a gravel area, a coarse sand area or the like). As shown in FIG. 6, "the work period" may be designated by start time (9:00, 9:15 or the like) and end time (9:15, 9:35 or the like) of the work period. As shown in FIG. 6, "the work content" may be designated by a type of work (soil loading, pile-up or the like) and a work goal ($\Delta\Delta m^3$ (cubic meters), until time or the like).

In the managing client 60, wireless communication equipment included in the managing output interface 620 transmits new work information or a change content of existing work information to the work assist server 10 (FIG. 4/STEP620).

In the work assist server 10, in a case where the new work information or the change content of the existing work information is recognized based on communication with the managing client 60 (FIG. 4/C10), the new work information is registered in the database 102, or the content of the work information registered in the database 102 is changed (FIG. 4/STEP102).

(Provision of Work Information)

In the remote operation device 20, it is determined whether there is a first designated operation through the remote input interface 210 by an operator OP (FIG. 4/STEP202). "The first designated operation" is, for example, an operation of a button or an operation lever included in the remote input interface 210 or the remote operation mechanism 211. In a case where the determination result is negative (NO in FIG. 4/STEP202), processing of and after the determination as to whether there is the first designated operation is repeated. On the other hand, in a case where the determination result is positive (YES in FIG. 4/STEP202), a designated work information request is transmitted to the work assist server 10 through the remote wireless communication equipment 222 (FIG. 4/STEP204).

The request includes information that can specify a designated position depending on the first designated operation. For example, a representative position of an area designated by the first designated operation in the remote input interface 210 may be specified as the designated position. Alternatively, a position of the work machine 40 operated or scheduled to be operated by the remote operation device 20 at time of the first designated operation, the position of the work machine 40 being measured by a positioning function by use of a GPS or the like, may be specified as the designated position. Furthermore, in a case where a first client is not the remote operation device 20 and corresponds to a mobile terminal carried by a worker in a site, a position of the mobile terminal at time of a first operation, the position being measured by the positioning function by use of the GPS or the like, may be specified as the designated position.

In the work assist server 10, in a case where the work information request is received (FIG. 4/C11), the first assist processing element 121 recognizes the designated position (FIG. 4/STEP104).

The first assist processing element 121 searches the database 102 for work information fitting the designated position as designated work information (FIG. 4/STEP106). For example, in a case where the representative position of the area designated by the operator is recognized as the designated position, the work information about work scheduled to be performed at current time or at and after designated time in the work location included in the area may be searched as the designated work information. "The designated time" may be set through the remote input interface 210 by the operator OP.

Also, in a case where a current position of the work machine 40 is recognized as the designated position, work information about work to be performed in a work location at a distance from the current position of the work machine 40 being equal to and less than a designated distance is searched as the designated work information. "The designated distance" may be constant or may change, for example, to a distance at which the work machine 40 can move from the current time by start time of the work period. In a case where the current position of the mobile terminal as the first client is recognized as the designated position, the designated distance may be a distance at which the operator OP carrying the mobile terminal can move to the current position of the work machine 40.

In a case where the work that can be performed differs with numerous factors of the work machine 40, such as specifications of the working mechanism 440, the work information about the work that can be performed may be searched as the designated work information in view of numerous factors of the remotely operated or actually operated work machine 40.

The second assist processing element 122 transmits the designated work information to the remote operation device 20 (first client) (FIG. 4/STEP108).

In the remote operation device 20, in a case where the designated work information is received through the remote wireless communication equipment 222 (FIG. 4/C22), the remote control device 200 causes the image output device 221 to output a work environment image showing a position of a designated work location and information about a designated work period and designated work content included in the designated work information (FIG. 4/STEP206).

Figure 7A:
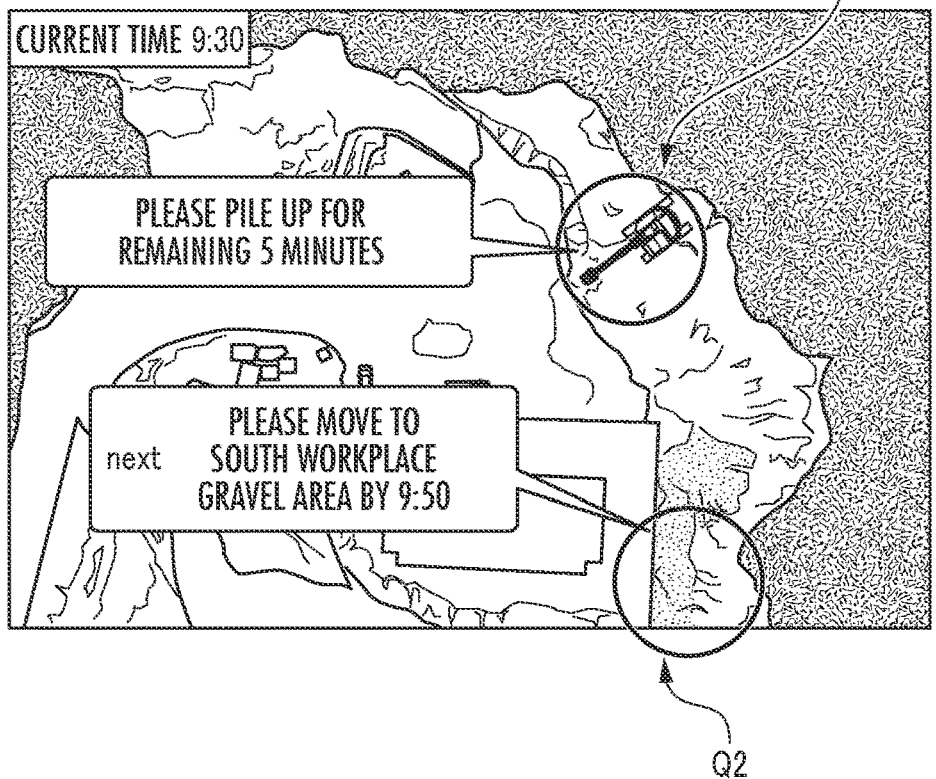
FIG. 7A is an explanatory view concerning a first example of an output image in a remote operation device.

Consequently, for example, as shown in FIG. 7A, the image output device 221 outputs a bird's eye image or a two-dimensional map of a work site showing a position of next work location Q2 in addition to a position of present work location Q1 where the work is performed using the work machine 40. This is the result of searching the database 102 for a plurality of pieces of designated work information that are continuous in time series. Also, as information about remaining time of the present work period and a present work content, a message "please pile up for remaining 5 minutes" is outputted. Furthermore, as information about the next work location and start time of next work period, a message "please move to south workplace gravel area by 9:50" is outputted. The message can be added and updated as at least part of the work information in the managing client 60 through an operation of the managing input interface 610. In this case, the work environment image may be outputted in the image output device included in the managing output interface 620, and the work information may be registered or updated on time through the touch panel and a touch keyboard included in the managing input interface 610.

Figure 7B:
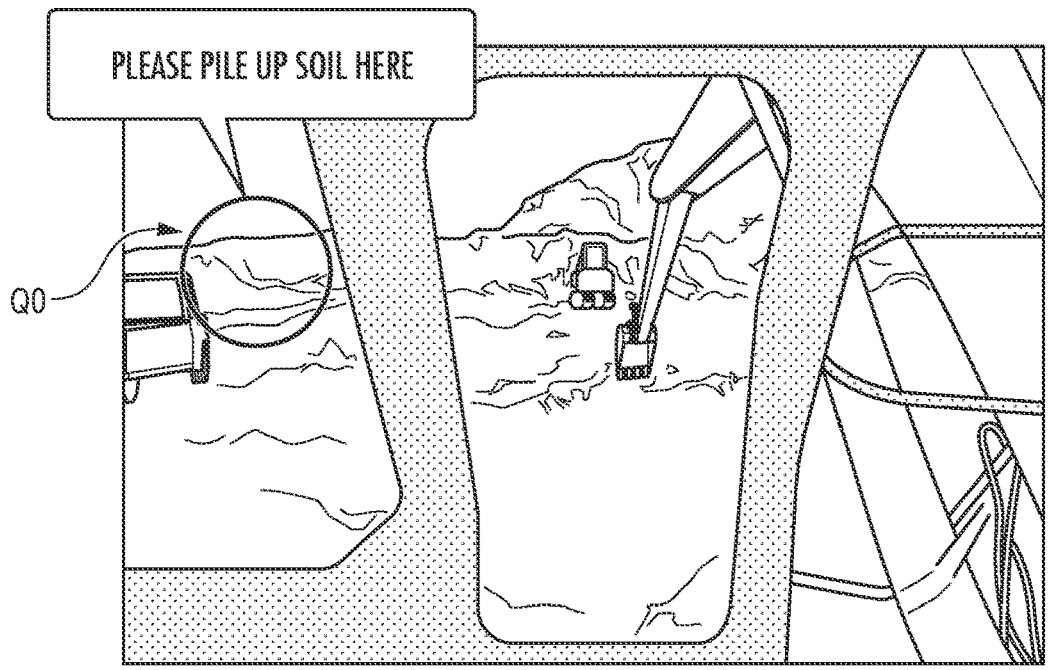
FIG. 7B is an explanatory view concerning a second example of the output image in the remote operation device.

Also, as shown in FIG. 7B, an environment image showing appearance before the work machine 40 in the work site, a position of a local work location Q0 in the work site and additionally, a message of "please pile up soil here" concerning the work content may be outputted in the image output device 221. The message can be added and updated as at least part of the work information in the managing client 60 through the operation of the managing input interface 610.

(Remote Operation of Work Machine)

In the remote operation device 20, it is determined whether there is a second designated operation through the remote input interface 210 by the operator OP (FIG. 5/STEP208). "The second designated operation" is, for example, an operation of tapping or the like in the remote input interface 210 to designate the work machine 40 intended to be remotely operated by the operator OP in the bird's eye work environment image (see FIG. 7A). In a case where the determination result is negative (NO in FIG. 5/STEP208), processing of and after the determination as to whether there is the second designated operation is repeated. On the other hand, in a case where the determination result is positive (YES in FIG. 5/STEP208), an environment confirmation request is transmitted to the work assist server 10 through the remote wireless communication equipment 222 (FIG. 5/STEP210).

In the work assist server 10, in a case where the environment confirmation request is received, the first assist processing element 121 transmits the environment confirmation request to the corresponding work machine 40 (FIG. 5/C12).

In the work machine 40, in a case where the environment confirmation request is received through the actual machine wireless communication equipment 422 (FIG. 5/C41), the actual machine control device 400 obtains a captured image through the imaging device 412 (FIG. 5/STEP402). The actual machine control device 400 transmits captured image data representing the captured image to the work assist server 10 through the actual machine wireless communication equipment 422 (FIG. 5/STEP404).

In the work assist server 10, in a case where the captured image data is received (FIG. 5/C13), environment image data (data representing all or part of the captured image itself or a simulated environment image generated based on this all or part of the captured image) depending on the captured image data is transmitted to the remote operation device 20 (FIG. 5/STEP110).

In the remote operation device 20, in a case where the environment image data is received through the remote wireless communication equipment 222 (FIG. 5/C23), the environment image depending on the environment image data is outputted in the image output device 221 (FIG. 5/STEP212). Consequently, for example, the environment image including the boom 441, the arm 443, the bucket 445 and the arm cylinder 444 that are some parts of the work attachment 440 as the working mechanism is displayed in each of the image output device 221 and a second image output device 221 (see FIG. 7B).

In the remote operation device 20, the remote control device 200 recognizes an operation mode of the remote operation mechanism 211 (FIG. 5/STEP214), and a remote operation command depending on the operation mode is transmitted to the work assist server 10 through the remote wireless communication equipment 222 (FIG. 5/STEP216).

In the work assist server 10, in a case where the remote operation command is received, the first assist processing element 121 transmits the remote operation command to the work machine 40 (FIG. 5/C14).

In the work machine 40, in a case where the actual machine control device 400 receives the operation command through the actual machine wireless communication equipment 422 (FIG. 5/C42), an operation of the work attachment 440 or the like is controlled (FIG. 5/STEP406). For example, work of scooping soil before the work machine 40 with the bucket 445 and rotating the upper turning body 420 to drop the soil from the bucket 445 is executed.

(Effects)

According to the work assist system with the above configuration and the work assist server 10 included in this system, in response to the first designated operation through the remote input interface 210 of the remote operation device 20 (first client), the remote output interface 220 of the remote operation device 20 outputs the work environment image showing the positions of the designated work locations Q1 and Q2, and the information about at least one of the designated work period and the designated work content (see FIG. 4/STEP after YES in STEP202 to STEP206, and FIGS. 7A and 7B). The designated work location, the designated work period and the designated work content are included in the designated work information that is work information fitting the designated position depending on the first designated operation among a plurality of pieces of work information registered in the database 102. Consequently, the operator OP (worker) of the work machine can recognize outline of the work to be performed using the work machine 40, which fits the designated position, from the work environment image, and the information about at least one of the designated work period and the designated work content.

Consequently, for example, it is easy for the worker to move the work machine 40 to the designated work location by beginning of the designated work period or to achieve a remotely operable state of the work machine 40 existing in the designated work location by the second designated operation (see FIG. 5/STEP208) and the like. Then, the worker can smoothly perform the work depending on the designated work content by remotely operating the work machine 40 through the remote operation device 20 over the designated work period.

The work environment image showing the positions of the plurality of designated work locations Q1 and Q2 included in the plurality of pieces of designated work information, respectively, continuous in time series, and the information about at least one of the designated work period and the designated work content included in at least one piece of designated work information among the plurality of pieces of designated work information are outputted in the remote output interface 220 (see FIG. 7A). In this case, the work environment image allows the worker to recognize the position of the work location (designated work location) of each of a plurality of works to be performed continuously in time series by the operator OP (worker) remotely operating or actually operating the common or different work machine 40. Also, the information about the work period (designated work period) and the work content (designated work content) concerning at least one work among the plurality of works can be recognized by the worker.

Consequently, for example, it is easy for the worker to move the work machine 40 from the present work location Q1 to the next work location Q2 from end of one designated work period by beginning of another designated work period subsequent to the end or to achieve an operable state of the work machine 40 existing in the next designated work location Q2 through the second designated operation. Then, the worker can smoothly perform the work depending on the designated work content by use of the work machine 40 over each of a plurality of designated work periods.

The first assist processing element 121 recognizes a current position of the work machine 40 as the designated position, based on communication with the client such as the remote operation device 20 or the work machine 40 cooperating with the client, and searches the database 102 for the work information of the position of the work location which matches the designated position, as one piece of designated work information among the plurality of pieces of designated work information. Consequently, outlines of the present work being performed by the worker using the work machine 40, and additionally, the work to be performed from next time by the worker using the same or different work machine 40 can be recognized.

The first assist processing element 121 recognizes, as designated time, time when there is the designated operation through the input interface of the client or time set by the designated operation, based on the communication with the client of the remote operation device 20 or the like, and searches the database 102 for the work information fitting the designated time in addition to the designated position, as the designated work information. Consequently, the worker of the work machine can recognize the outline of the work to be performed using the work machine 40, which fits the designated time in addition to the designated position, from the work environment image, and the information about at least one of the designated work period and the designated work content.

The first assist processing element 121 recognizes at least one of new work information and the change content of the work information stored and held in the database 102, which are inputted through the managing input interface 610 of the managing client 60, based on the communication with the managing client 60, and causes the database 102 to store and hold at least one of the new work information and the work information in which the change content is reflected.

In this case, a work manager may register, in the database 102, new work information inputted using the managing client 60 and work information obtained after changing at least a part of the content of the work information registered in the database 102. Consequently, the worker of the work machine 40 can recognize the outline of the work to be performed using the work machine 40 as scheduled or intended by the work manager, from the work environment image outputted in the output interface of the client such as the remote operation device 20, and the information about at least one of the designated work period and the designated work content.

Other Embodiments of Present Invention

In the above embodiment, the work assist server 10 is configured with one or more servers separate from each of the remote operation device 20, the work machine 40 and the managing client 60 (see FIG. 1), and as another embodiment, however, the work assist server 10 may be a constituent element of the remote operation device 20, the work machine 40 or the managing client 60. Each of the respective constituent elements 110, 121 and 122 of the work assist server 10 may be a constituent element of each of two or more of the remote operation device 20, the work machine 40 and the managing client 60 which are mutually communicable.

REFERENCE SIGNS LIST 10 work assist server
20 remote operation device
40 work machine
60 managing client
102 database
121 first assist processing element
122 second assist processing element
210 remote input interface
220 remote output interface
410 actual machine input interface
420 actual machine output interface
440 work attachment (working mechanism)
610 managing input interface
620 managing output interface

The invention claimed is:

1. A work assist system comprising a work machine, a client assigned to a worker of the work machine, and a server, the work assist system configured to assist the worker in performing work by use of the work machine, by communication between the work machine, the client, and the server, wherein the work machine comprises an imaging device, an actual machine wireless communication equipment configured to transmit an image captured by the imaging device to the server and receive a remote operation command from the server, a working mechanism, an actual machine control device configured to control movement of the working mechanism by the remote operation command, and a positioning system having a positioning function configured to determine a position of the work machine:

the client includes a first client;

the first client comprises a remote input interface configured of a remote operation mechanism operated by the worker for moving the work machine, a remote wireless communication equipment configured to recognize an operation mode of the remote operation mechanism and transmit the remote operation command depending on the operation mode to the server, and receive from the server an environment image data, and a remote output interface composed of an image output device for outputting an image and which outputs the environment image data;

the remote input interface of the first client is configured to determine whether there is a designated operation by the worker, and in a case where a result of the determination is positive, transmit a designated work information to the server through the remote wireless communication equipment;

the server comprises an environment image data transmission processing element configured by a processor which executes a processing of transmitting the environment image data according to the captured image data in a case where captured image is received from the work machine, and a remote operation command transmission processing element configured by the processor and in a case where the remote operation command is received from the first client, which executes a processing of transmitting the remote operation command to the work machine;

the server further comprises a database which stores and holds, as work information, a plurality of combinations of work locations, work periods and work contents, a designated position recognition processing element configured by the processor which recognizes the position determined by the positioning system of the work machine as a designated position in a case where the designated work information is received, a search element configured by the processor which searches matching work information that matches the designated position from the database, and a work information transmission element configured by the processor which executes processing of transmitting the matching work information to the work machine;

the matching work information includes information to output a work environment image showing a position of a designated work location and information about at least one of a designated work period and a designated work content included in the designated work information; and the remote output interface of the first client is configured to output the work environment image and the information about at least one of the designated work period and the designated work content included in the matching work information received from the server.

2. The work assist system according to claim 1, wherein the search element searches the database for a plurality of pieces of designated work information that are continuous in time series and fit the designated position, the work information transmission element executes processing to transmit to the work machine a second work environment image showing positions of a plurality of designated work locations included in the plurality of pieces of designated work information, respectively, searched by the search element, and the plurality of pieces of designated work information, and the remote output interface of the first client is configured to output the second work environment image showing positions of the plurality of designated work locations included in the plurality of pieces of designated work information, respectively, searched by the search element, and information about at least one of the plurality of pieces of designated work information.

3. The work assist system according to claim 1, wherein the client includes a second client, the second client comprises a managing input interface to which new work information and a change content of the work information stored and held in the database is input by a manager using the second client, and a wireless communication equipment which transmits to the server the new work information or the change content of the work information, and the server further comprises a registration reflection element configured by the processor which recognizes at least one of the new work information and the change content of the work information stored and held in the database based on communication with the second client, and causes the database to store and hold at least one of the new work information and the change content of the work information.

* * * * *